(12) United States Patent
Mukherjee et al.

(10) Patent No.: US 8,411,743 B2
(45) Date of Patent: Apr. 2, 2013

(54) ENCODING/DECODING SYSTEM USING FEEDBACK

(75) Inventors: Debargha Mukherjee, Sunnyvale, CA (US); Wai-Tian Tan, Sunnyvale, CA (US); Andrew J. Patti, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 12/771,554

(22) Filed: Apr. 30, 2010

(65) Prior Publication Data
US 2011/0268186 A1 Nov. 3, 2011

(51) Int. Cl.
*H04N 7/12* (2006.01)
(52) U.S. Cl. ............................. 375/240.07
(58) Field of Classification Search . 375/240.05–240.07
See application file for complete search history.

(56) References Cited

U.S. PATENT DOCUMENTS

| 5,515,377 | A | * | 5/1996 | Horne et al. | 370/395.64 |
| 2007/0253479 | A1 | * | 11/2007 | Mukherjee | 375/240.1 |
| 2009/0003452 | A1 | * | 1/2009 | Au et al. | 375/240.17 |
| 2009/0323809 | A1 | * | 12/2009 | Raveendran | 375/240.16 |

OTHER PUBLICATIONS

D. Mukherjee, A robust reversed-complexity Wyner-Ziv video codec introducing sign-modulated codes, Tech. Rep. HPL-2006-80, HP Laboratories Palo Alto, Aug. 2006.*
"Feedback-Based Error Control for Mobile Video Transmission", Proceedings of the IEEE, vol. 87, No. 10, Oct. 1999, to Girod.*

* cited by examiner

*Primary Examiner* — Mehrdad Dastouri
*Assistant Examiner* — Mohammed Rahaman

(57) ABSTRACT

A computer-implemented method for encoding using feedback. A base layer of a current frame is encoded. The residue of the current frame is generated. The residue of the current frame is encoded. Also, in response to feedback from a receiver, a coding strategy for each block of the current frame is determined and coding is performed according to one or more of source coding and Wyner-Ziv coding. The feedback is based on the base layer of the current frame and previous correctly received enhancement frames.

13 Claims, 5 Drawing Sheets

400

```
┌─────────────────────────────────────┐
│  decode a base layer of a current frame │
│                 410                     │
└─────────────────────────────────────┘
                  ↓
┌─────────────────────────────────────┐
│ decode enhancement information of the current frame │
│                 420                     │
└─────────────────────────────────────┘
                  ↓
┌─────────────────────────────────────┐
│ generate a semi-super-resolved frame corresponding │
│ to the decoded base layer of the current frame and the │
│       decoded enhancement information             │
│                 430                     │
└─────────────────────────────────────┘
                  ↓
┌─────────────────────────────────────┐
│ generate feedback based on the decoded base layer of │
│ the current frame and previous correctly received │
│ decoded enhancement information, wherein the │
│         feedback is macroblock based              │
│                 440                     │
└─────────────────────────────────────┘
                  ↓
┌─────────────────────────────────────┐
│       transmit the feedback to sender           │
│                 450                     │
└─────────────────────────────────────┘
```

FIG. 4

500 generate a semi-super-resolved frame corresponding to the decoded base layer of the current frame and the decoded enhancement information
510 generate feedback based on the decoded base layer of the current frame and previous correctly received decoded enhancement information, wherein the feedback is macroblock based
520 in response to feedback from a receiver, wherein the feedback is based on the base layer of the current frame and previous correctly received enhancement frames: determine coding strategy for each block of the current frame; and code according to one or more of source coding and Wyner-Ziv coding
530

FIG. 5

ENCODING/DECODING SYSTEM USING FEEDBACK

BACKGROUND

Widespread proliferation of mobile battery-powered handheld devices with audio-visual capture and communication capability, have prompted research in real-time encoding and communication algorithms that are low-complexity. The primary channel for communication is unreliable wireless, making the problem of reliable communication even more challenging. Also, for many low-power devices, encoding a captured video at full-resolution can be an excessive drain on power.

Most prior solutions do not address good compression performance, error resilience, and low-encoding complexity simultaneously, even though most handheld devices need to address all. Naïve solutions such as all Intra encoding or encoding with frame difference are low-complexity, but not efficient enough in bit-rate. Recently, a variety of solutions have been proposed for reversed complexity encoding that try to push complex motion estimation tasks to the decoder side in order to control encoding complexity, while still allowing a compact bit-stream to be transmitted. Some of these solutions use some form of Wyner-Ziv coding. While use of feedback has been used extensively in the context of Wyner-Ziv coding, such feedback has mostly been based on channel coding mechanisms for Wyner-Ziv coding, which are not the most efficient, and inevitably require multiple back and forth transmissions that increase the delay excessively.

Moreover, most other work on reversed complexity coding use temporal interleaving. This requires frame interpolation techniques at the receiver end to generate the side-information. However, the quality of the side-information generated by that manner usually is low and has many artifacts.

BRIEF DESCRIPTION OF THE DRAWINGS

FIG. 4 illustrates an example of a flow chart of a method for decoding, in accordance with an embodiment of the present invention.

FIG. 5 illustrates an example of a flow chart of a method for encoding/decoding, in accordance with an embodiment of the present invention The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
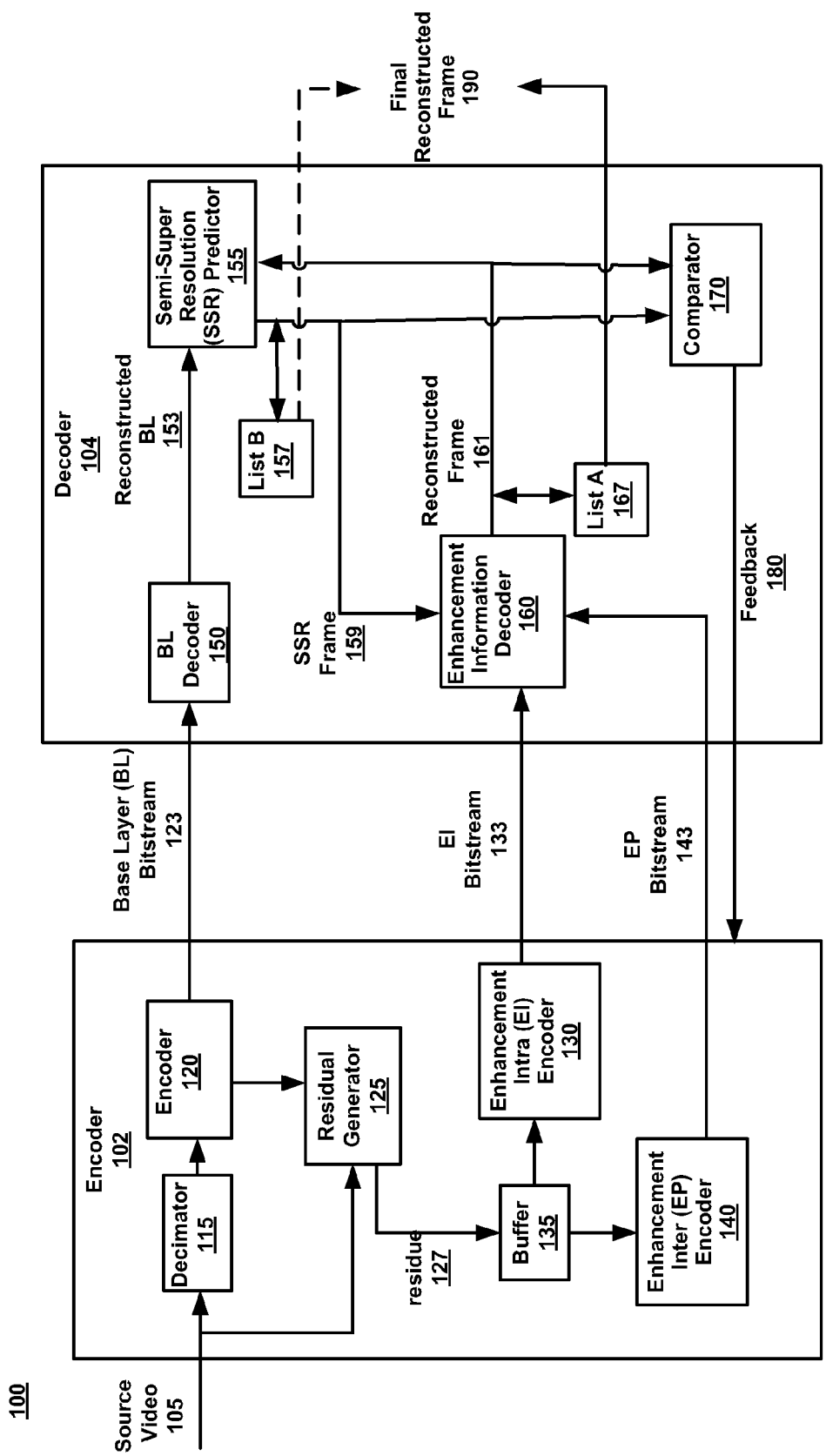
FIG. 1 illustrates an example of a system for encoding/decoding, in accordance with an embodiment of the present invention.

FIG. 1 depicts a system 100 configured for encoding/decoding using feedback, in accordance to an embodiment of the present invention. System 100 includes encoder 102 and decoder 104. It should be appreciated that encoder 102 and decoder 104 are implemented within separate computer systems. In various embodiments, encoder 102 and decoder 104 are communicatively coupled over a network (not shown), e.g., a local area network (LAN), and intranet, the Internet, or other type of communication network. It should be appreciated that encoder 102 and decoder 104 can be implemented as hardware, firmware, software and hardware, software and firmware, or hardware, software and firmware. Moreover, it should be appreciated that system 100 may include additional components that are not shown so as to not unnecessarily obscure aspects of the embodiments of the present invention.

For purposes of clarity and brevity, the instant description of embodiments and examples will specifically deal with video data. Embodiments of the present invention, however, are not limited solely to use with video data. Instead, the embodiments of the present invention are well suited to use with image-based data, web page-based data, graphic data and the like.

Encoder 102 is configured to receive source video 105. Source video 105 includes a plurality of frames 200 (depicted in FIG. 2). Frames 200 can include any number of frames. In one embodiment, frames 200 can include frames N–x through N+y. In particular, frames N–3 through N–1 are previous encoded frames transmitted to decoder 104 and frame N is a current frame. Accordingly, frames N+1 through N+3 are frames that are subsequently encoded after current frame N.

Referring now to FIG. 1, encoder 102 includes decimator 115, encoder 120, residual generator 125, buffer 135, enhancement intra (EI) encoder 130 and enhancement inter (EP) encoder 140. Encoder 102 is configured to receive source video 105 and output data to decoder 104.

Decimator 115 is configured to receive and downsample source video 105. Decimator 115 downsamples on a frame by frame basis. In one embodiment, decimator 115 downsamples by a factor of 2.

Encoder 120 is configured to encode downscaled frames 200 of source video 105. In one embodiment, encoder 120 encodes and transmits a base layer bitstream 123. Various error resilient transmission tools may be used to transmit the base layer bitstream 123 reliably. In various embodiments, encoder 120 utilizes high-performance codec implementations (e.g., H.264/AVC, MPEG).

Accordingly, base layer bitstream 123 can be transmitted reliably over an unreliable network using a variety of methods, because the bit-rate of this base layer bitstream is small. One example for real-time communication is by use of Reference Picture Selection, where every frame of the base layer bitstream 123 is encoded only based on previously acknowledged frames. Another example is Forward Error Correction (FEC).

Residual generator 125 is configured to generate residue 127 corresponding to source video 105 and base layer bitstream 123. In one embodiment, residue 127 is Laplacian residue. Buffer 135 is configured to receive residue 127. In another embodiment, residue 127 is enhancement information associated with source video 105.

EI encoder 130 is configured to encode residue 127 in buffer 135 and subsequently transmit EI bitstream 133 (e.g., EI pictures) to decoder 104. In one embodiment, EI encoder 130 periodically encodes residue 127.

EP encoder 140 is configured to encode residue 127 and subsequently transmit EP bitstream 143 (e.g., EP pictures) to decoder 104. In one embodiment, EP encoder 140 waits for feedback 180 from encoder 104 to encode residue 127 and subsequently transmit EP bitstream 143 to decoder 104.

Encoder 102 (in particular, EP encoder 140) uses feedback 180 received from decoder 104 to determine if and when to encode residue 127 (e.g., enhancement layer Laplacian residue) at an appropriate rate. In one embodiment, if feedback 180 is not received or received too late, for some frames there is no residue enhancement information sent. In other words, there is a "skipping" of Laplacian residue for certain frames. In one embodiment, residue 127 is discarded from buffer 135. In another embodiment, if feedback 180 is received, then feedback 180 is used to decide a coding strategy for each region (for example, a block) of a current frame. In various embodiments, enhancement information is coded using a combination of traditional video source coding (hereafter referred to just as source) and Wyner-Ziv coding.

In various embodiments, the enhancement information is transmitted lagging in time behind the base layer bitstream 123. In one embodiment, the lag time can be quite small, for instance, over WiFi. The lag time is determined by the sum of the round-trip time between the encoder 102 (e.g., sender) and decoder 104 (e.g., receiver), and the processing time at decoder 104.

Accordingly, an associated bit-rate automatically adapts to losses experienced by the enhancement layer during transmission, because the statistics fed back by decoder 104 is based on the base layer frame and previous correctly received enhancement frames, which will be described in detail below. In other words, if the enhancement information for a frame is lost, it is not used for computing the statistics for subsequent frames, and so if the rate transmitted for a subsequent frame's enhancement information is based on the statistics, it will automatically adapt the rate transmitted at the enhancement layer.

Still referring to FIG. 1, decoder 104 includes base layer decoder 150, semi-super-resolution (SSR) predictor 155, enhancement information decoder 160, comparator 170, List A 167 and List B 157.

Base layer decoder 150 is configured to receive and decode base layer bitstream 123. In various embodiments, base layer decoder 150 utilizes high-performance codec implementations (e.g., H.264/AVC, MPEG). Base layer decoder 150 generates reconstructed base layer 153.

Semi-Super-Resolution (SSR) predictor 155 is configured to receive reconstructed base layer 153 and generate a SSR frame 159 by using frames in current List A 167 and List B 157. In one embodiment, frames in List A 167 are utilized first, and List B is consulted only if a good match is not found in List A. Once generated, SSR frame 159 is inputted into List B 157 for subsequent use.

Specifically, decoder 104 maintains two lists of previously reconstructed full-resolution frames. List A 167 is the list of correctly received and decoded enhancement frames (e.g., reconstructed frame(s) 161) using the enhancement information transmitted. List B is a list of frames (e.g., SSR frame(s) 159) that have been reconstructed using a suitable semi-super-resolution operation using only the base layer and previous List A or List B frames. For example, current frame N of FIG. 2 (i.e., not using enhancement information of current frame).

Comparator 170 is configured to generate feedback 180 and transmit feedback 180 to encoder 102. In one embodiment, comparator 170 compares a most recent frame in list B 157 to a previous corresponding frame in List A 167 and List B 157. In one embodiment, feedback 180 indicates how "good" the match is (e.g., on scale of 0-1) on a region-by-region basis.

In particular, in the process of matching required for the semi-super-resolution operation, comparator 170 also computes a confidence measure or a goodness of match metric for each region by searching frames in the lists of references. In one embodiment block is used as a region. This information on a per block basis is suitably compressed and sent back as feedback 180. In one embodiment, the information can be quantized into only a few levels in order to reduce the size of feedback 180. Note that this information is strongly correlated with the rate needed to be sent for each block, and provides valuable clues to encoder 102 on the encoding strategy to use for each block of the enhancement layer Laplacian residue (e.g., residue 127).

Encoder 102 uses the feedback information and computes variances of the Laplacian residue in the transform domain in order to classify blocks into several classes, and then uses appropriate coding tools to code each class. For instance, for one class of blocks no information is sent; for another class, the entire residue is coded regularly; and for one or more remaining classes Wyner-Ziv coding techniques may be used to send only partial information.

Further, Wyner-Ziv coding, is not constrained to use channel coding. In one embodiment, simple coset coding is utilized.

In one embodiment, feedback 180 provides information that enables the encoder to make appropriate coding decisions for the enhancement layer. Based on the coding decisions, a combination of source and Wyner-Ziv coding mechanisms are used to send the enhancement information.

Enhancement information decoder 160 is configured to receive and decode enhancement information (e.g., EI bitstream 133 and/or EP bitstream 143). In one embodiment, EI bitstream 133 is decoded in a normal manner (e.g., H.264/AVC, MPEG) when EI bitstream is periodically received.

Enhancement information decoder 160 is further configured to wait for enhancement information to be received.

In one embodiment, if enhancement information is received, an enhancement layer is decoded using the corresponding List B frame as side-information. Reconstructed frame 161 is added to List A, while the corresponding frame (e.g., SSR frame 159) from List B is removed. Moreover, all List B frames remaining are updated based on the new enhancement frame reconstructed, by recomputing the semi-super-resolution operation.

In another embodiment, if enhancement information is not received within an allotted time, the current corresponding List B frame is assumed to be the final reconstruction of the frame (e.g., final reconstructed frame 190).

In response to either enhancement information either received or not received with an allotted time, as described above, Lists A and B are updated so as to keep only the latest certain number of frames in each list.

In one embodiment, output of final reconstructed frame 190 depends on the round trip time (RTT) and how much delay is tolerable. For example, in a video conferencing application only a few hundred milliseconds is acceptable, so if the RTT and encoding/decoding time is less than this, then the A list would be output; otherwise the B list must be used as output.

In various embodiments, encoder 102 may send compact statistical information about the enhancement layer along with the base layer before the decoder 104 computes statistics and feedback information. As a result, decoder 104 makes most of the decisions about coding classification and transmits back only the final result (e.g., feedback 180). Encoder 102 will simply follow these decisions.

Figure 2:
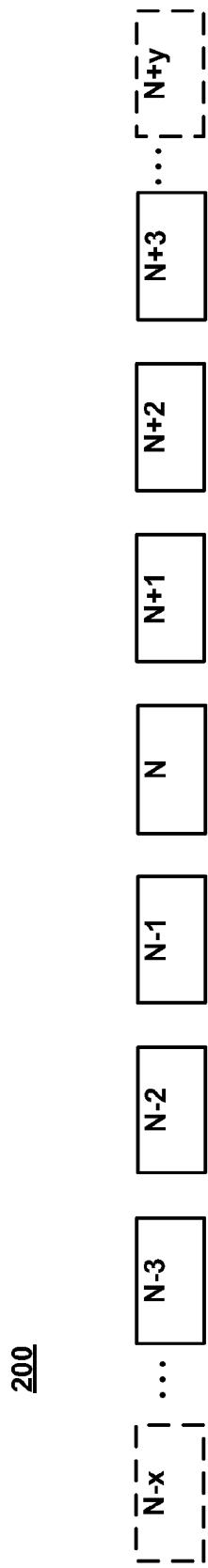
FIG. 2 illustrates an example of a plurality of frames, in accordance with an embodiment of the present invention.
Figure 3:
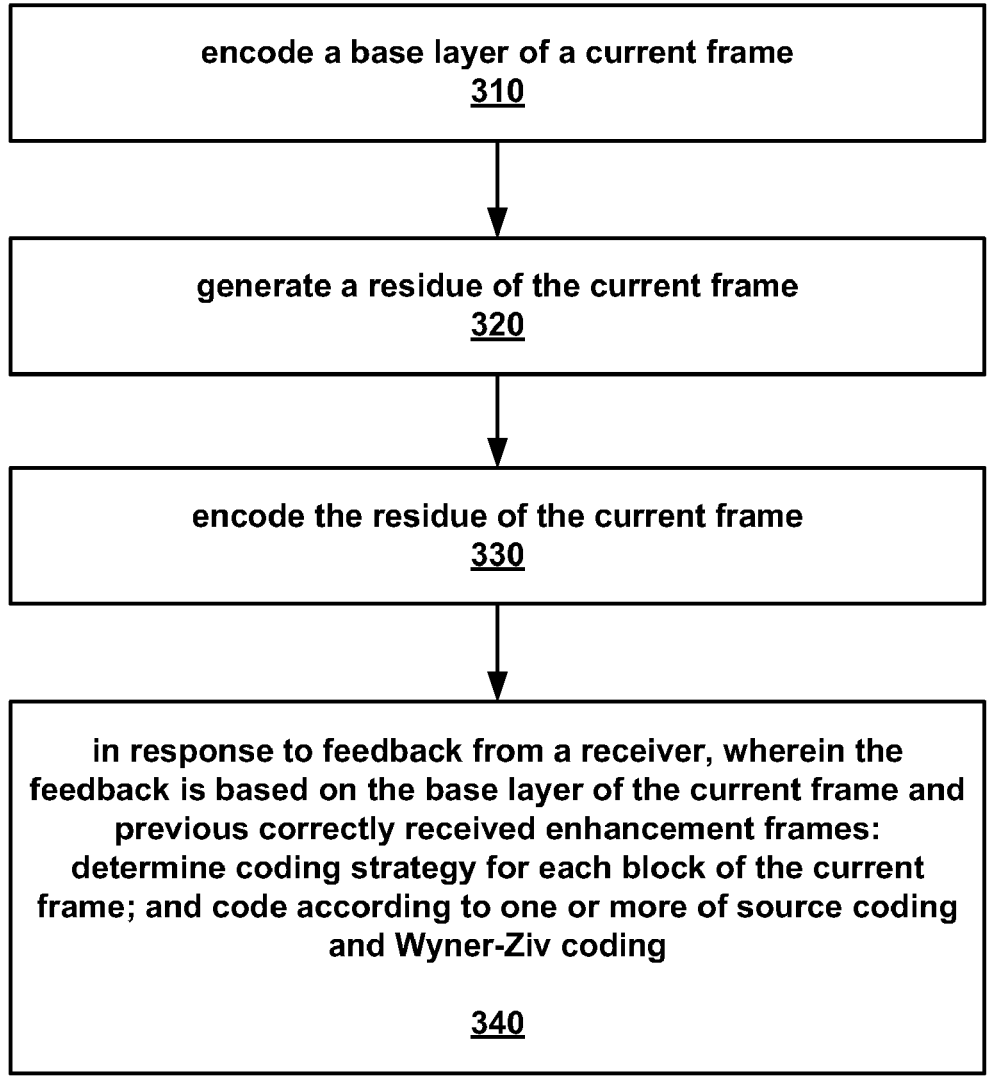
FIG. 3 illustrates an example of a flow chart of a method for encoding, in accordance with an embodiment of the present invention.

FIG. 3 depicts a method 300 for encoding using, in accordance with an embodiment of the present invention. In one embodiment, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 300 is performed at least by system 100 described in FIGS. 1 and 2.

At 310, a base layer of a current frame is encoded. For example, a base layer of current frame N of FIG. 2 is encoded.

At 320, a residue of the current frame is generated. For example, residue 127 is Laplacian residue.

At 330, a residue of the current frame is encoded. For example, residue 127 is encoded as EI pictures and/or EP pictures.

At 340, in response to feedback from a receiver, wherein the feedback is based on the base layer of the current frame and previous correctly received enhancement frames: coding strategy for each block of the current frame is determined; and one or more of source coding and Wyner-Ziv coding is utilized to code. In particular, in one embodiment, in response to feedback from a receiver, wherein the feedback is based on the base layer of the current frame and previous SRR versions of base layer frames (e.g., List B 157) and correctly received enhancement frames (list A, 167): coding strategy for each block of the current frame is determined; and one or more of source coding and Wyner-Ziv coding is utilized to code. In another embodiment, some blocks of current frame are coded using source coding and other blocks are coded using Wyner-Ziv coding.

FIG. 4 depicts a method 400 for decoding using feedback, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 400 is performed at least by system 100 described in FIGS. 1 and 2.

At 410, a base layer of a current frame is decoded. For example, a base layer of current frame N of FIG. 2 is decoded.

At 420, enhancement information of the current frame is decoded. For example, EI bitstream and/or EP bitstream is decoded.

At 430, a SSR frame corresponding to the decoded base layer of the current frame and the decoded enhancement information is generated. For example, SSR frame 159 is generated.

At 440, feedback based on the decoded base layer of the current frame and previous correctly received decoded enhancement information is generated. The feedback is region, or in specific cases, block based. In one embodiment, feedback 180 is a generated macroblock-based map.

At 450, the feedback is transmitted to a sender. For example, feedback 180 is generated at decoder 104 and transmitted to encoder 102.

FIG. 5 depicts a method 500 for encoding/decoding using feedback, in accordance with an embodiment of the present invention. In one embodiment, method 500 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 500 is performed at least by system 100 described in FIGS. 1 and 2.

At 510, a SSR frame corresponding to the decoded base layer of the current frame and the decoded enhancement information is generated. For example, SSR frame 159 is generated.

At 520, feedback based on the decoded base layer of the current frame and previous correctly received decoded enhancement information is generated. The feedback is macroblock based. In particular, in one embodiment, feedback is based on the base layer of the current frame and previous SRR versions of base layer frames (e.g., List B 157) and correctly received enhancement frames (list A, 167)

At 530, in response to feedback from a receiver, wherein the feedback is based on the base layer of the current frame and previous correctly received enhancement frames: coding strategy for each block of the current frame is determined; and one or more of source coding and Wyner-Ziv coding is utilized to code. In one embodiment, some blocks of current frame are coded using source coding and other blocks are coded using Wyner-Ziv coding.

There are a plurality of advantages of system 100 and methods 300-500, as described above. For example, sending the base-layer with high probability of reception strategy provides a reasonable lower bound on the quality of video received. The low-power sender just needs to encode a low-res video and only use computations equivalent to intra for the enhancement layer. Together the complexity of encoding a frame is substantially reduced from full-resolution AVC or SVC encoding. The decoder does most of the hard work in finding the best semi-super-resolution frame. The information fed back provides valuable clues to the encoder to decide how to code the enhancement residual information, so as to obtain a compact bit-stream. Since the information fed back adapts based on the frames received, the bit-rate transmitted also tracks the loss characteristics.

Various embodiments of the present invention are thus described. While the present invention has been described in particular embodiments, it should be appreciated that the present invention should not be construed as limited by such embodiments, but rather construed according to the following claims.

The invention claimed is:

1. A computer-implemented method for encoding using feedback, said method comprising:
encoding a base layer of a current frame;
if it is determined to generate a residue, then generating said residue of said current frame, and encoding said residue of said current frame; and in response to feedback from a receiver, wherein said feedback is based on said base layer of said current frame, previously correctly received enhancement frames that were previously and correctly received by said receiver, and a goodness match metric determined with a comparison between a most recent frame in a first list to a previous corresponding frame in a second list, wherein said first list is a list of frames that have been reconstructed using said base layer and said second list is a list of said previously correctly received enhancement frames:
determining coding strategy for each block of said current frame; and
coding according to one or more of source coding and Wyner-Ziv coding.

2. The computer-implemented method of claim 1, wherein said encoding said residue comprises:
periodically encoding said residue as enhancement intra (EI) pictures.

3. The computer-implemented method of claim 1, wherein said encoding said residue comprises:
encoding said residue as enhancement, inter (EP) pictures.

4. The computer-implemented method of claim 1, wherein the residue is a Laplacian residue and the method further comprises:
skipping the generating of said Laplacian residue.

5. The computer-implemented method of claim 1, wherein said method further comprises:
transmitting said encoded residue after transmitting said encoded base layer of said current frame.

6. A computer-implemented method for decoding using feedback, said method comprising:
decoding a base layer of a current frame;
decoding enhancement information of said current frame;
generating a semi-super-resolved frame corresponding to said decoded base layer of said current frame and said decoded enhancement information;
generating feedback based on said decoded base layer of said current frame, previously correctly received decoded enhancement information, and a goodness match metric determined with a comparison between a most recent frame in a first list to a previous corresponding frame in a second list, wherein said feedback is macroblock based; and wherein said first list is a list of frames that have been reconstructed using said base layer and said second list is a list of previously correctly received enhancement frames; and
transmitting said Feedback to sender.

7. The computer-implemented method of claim 6, said method further comprising:
maintaining a first list of previously reconstructed full-resolution frames comprising:
correctly received and decoded enhancement frames.

8. The computer-implemented method of claim 6, said method further comprising:
maintaining a second list of previously reconstructed full-resolution frames comprising:
semi-super-resolved reconstructed frames.

9. The computer-implemented method of claim 6, said method further comprising:
in response to receiving enhancement information, decoding enhancement layer using semi-super-resolved reconstructed flames as side information.

10. The computer-implemented method of claim 6, said method comprising:
in response to not receiving enhancement information within an allotted time, designating current a corresponding semi-super-resolved reconstructed frame as final reconstructed frame.

11. A non-transitory computer-readable storage medium for storing instructions that when executed by one or more processors perform a method for coding using feedback, said method comprising:
generating a semi-super-resolved frame corresponding to a decoded base layer of a current frame and decoded enhancement information;
generating feedback based on said decoded base layer of said current frame and previously correctly received decoded enhancement information, wherein said feedback is macroblock based; and
in response to feedback from a receiver, wherein said feedback is based on said base layer of said current frame, previous correctly received enhancement frames, and a goodness match metric determined with a comparison between a most recent frame in a first list to a previous corresponding frame in a second list, wherein said first list is a list of frames that have been reconstructed using said base layer and said second list is a list of said previously correctly received enhancement frames:
determining coding strategy for each block of said current frame; and
coding according to one or more of source coding and Wyner-Ziv coding, wherein coding is selected from a group consisting of encoding and decoding.

12. The computer-readable storage medium of claim 11, wherein said method further comprises:
in response to receiving enhancement information, decoding enhancement layer using semi-super-resolved reconstructed frames as side information.

13. The computer-readable storage medium of claim 11, wherein said method further comprises:
in response to not receiving enhancement information within an allotted time, designating current a corresponding semi-super-resolved reconstructed frame as final reconstructed frame.

* * * * *

UNITED STATES PATENT AND TRADEMARK OFFICE
CERTIFICATE OF CORRECTION

PATENT NO. : 8,411,743 B2  
APPLICATION NO. : 12/771554  
DATED : April 2, 2013  
INVENTOR(S) : Debargha Mukherjee et al.

It is certified that error appears in the above-identified patent and that said Letters Patent is hereby corrected as shown below:

In the Claims:

In column 7, line 22, in Claim 3, delete "enhancement," and insert -- enhancement --, therefor.

In column 7, line 48, in Claim 6, delete "Feedback" and insert -- feedback --, therefor.

In column 8, line 10, in Claim 9, delete "flames" and insert -- frames --, therefor.

Signed and Sealed this  
Thirteenth Day of August, 2013

Teresa Stanek Rea  
*Acting Director of the United States Patent and Trademark Office*